(12) United States Patent
Dunk

(10) Patent No.: US 7,934,015 B2
(45) Date of Patent: *Apr. 26, 2011

(54) SYSTEM AND METHOD FOR ADDRESSING A MOBILE DEVICE IN AN IP-BASED WIRELESS NETWORK

(75) Inventor: Craig A. Dunk, Waterloo (CA)

(73) Assignee: Research In Motion Limited, Waterloo (CA)

( * ) Notice: Subject to any disclaimer, the term of this patent is extended or adjusted under 35 U.S.C. 154(b) by 4 days.

This patent is subject to a terminal disclaimer.

(21) Appl. No.: 12/539,038

(22) Filed: Aug. 11, 2009

(65) Prior Publication Data

US 2009/0296646 A1 Dec. 3, 2009

Related U.S. Application Data

(63) Continuation of application No. 10/488,488, filed as application No. PCT/CA02/01336 on Aug. 29, 2002, now Pat. No. 7,581,020.

(60) Provisional application No. 60/316,096, filed on Aug. 29, 2001.

(51) Int. Cl.
*G06F 15/173* (2006.01)

(52) U.S. Cl. .......................... 709/238; 709/230; 709/245

(58) Field of Classification Search .................. 709/230, 709/238, 245
See application file for complete search history.

(56) References Cited

U.S. PATENT DOCUMENTS

| | | | |
|---|---|---|---|
| 6,064,879 A | 5/2000 | Fujiwara et al. | |
| 6,704,295 B1 | 3/2004 | Tari et al. | |
| 6,888,845 B2 * | 5/2005 | Watanuki et al. | 370/466 |
| 6,895,007 B1 * | 5/2005 | Teraoka | 370/392 |
| 7,027,800 B2 * | 4/2006 | Haumont et al. | 705/14.64 |
| 7,027,826 B2 | 4/2006 | Mizell et al. | |
| 7,305,480 B2 * | 12/2007 | Oishi et al. | 709/230 |
| 2001/0005675 A1 * | 6/2001 | Aho | 455/412 |
| 2002/0026482 A1 * | 2/2002 | Morishige et al. | 709/206 |
| 2002/0032029 A1 * | 3/2002 | Angin | 455/428 |
| 2002/0138622 A1 * | 9/2002 | Dorenbosch et al. | 709/227 |
| 2002/0154624 A1 * | 10/2002 | Oishi et al. | 370/350 |
| 2003/0007481 A1 * | 1/2003 | Wada et al. | 370/349 |
| 2003/0039237 A1 * | 2/2003 | Forslow | 370/352 |
| 2003/0224792 A1 * | 12/2003 | Verma et al. | 455/436 |

(Continued)

FOREIGN PATENT DOCUMENTS

WO 01/10091 A1 2/2001

*Primary Examiner* — Joseph Avellino
*Assistant Examiner* — Mohamed Wasel
(74) *Attorney, Agent, or Firm* — Jones Day; Krishna K. Pathiyal; Robert C. Liang

(57) ABSTRACT

A system and method for addressing a mobile device in an IP-based wireless network is provided. Push service providers prepare data for transmission to the mobile device using a first IP address. The addressed data is then transmitted to a push proxy. The push proxy obtains a network identifier that is permanently associated with the wireless mobile device using the first IP address. The network identifier is then used by the push proxy to obtain a second IP address that is temporarily associated with the wireless mobile device. Using this second IP address, the data from the push proxy is then addressed and transmitted to the wireless mobile device via a tunnel created through the wireless network using the second IP address.

15 Claims, 10 Drawing Sheets

U.S. PATENT DOCUMENTS

| | | | |
|---|---|---|---|
| 2004/0037259 A1* | 2/2004 | Steinberg | 370/338 |
| 2004/0110497 A1* | 6/2004 | Little | 455/418 |
| 2004/0116119 A1* | 6/2004 | Lewis et al. | 455/435.1 |
| 2004/0146039 A1* | 7/2004 | Soininen et al. | 370/349 |
| 2004/0148428 A1* | 7/2004 | Tsirtsis | 709/238 |
| 2004/0176129 A1* | 9/2004 | Menon et al. | 455/554.1 |
| 2005/0058124 A1* | 3/2005 | Helferich | 370/352 |
| 2005/0176410 A1* | 8/2005 | Brooking et al. | 455/412.1 |
| 2005/0190713 A1* | 9/2005 | Watanuki et al. | 370/315 |
| 2005/0190790 A1* | 9/2005 | Oishi et al. | 370/466 |
| 2006/0095525 A1* | 5/2006 | Mousseau et al. | 709/206 |
| 2008/0045265 A1* | 2/2008 | Yach et al. | 455/556.1 |

* cited by examiner

SYSTEM AND METHOD FOR ADDRESSING A MOBILE DEVICE IN AN IP-BASED WIRELESS NETWORK

CROSS REFERENCE TO RELATED APPLICATIONS

This application is a continuation of U.S. application Ser. No. 10/488,488, filed on Feb. 27, 2004 (U.S. Pat. No. 7,581,020), which is a national phase entry under 35 USC 371 of PCT application PCT/CA02/01336, filed on Aug. 29, 2002. This application is also related to and claims priority from U.S. Provisional Application 60/316,096, filed on Aug. 29, 2001. All of these prior applications are hereby incorporated by reference into this application.

BACKGROUND

1. Field of Technology

This patent application is directed to the problem of addressing wireless mobile devices that do not have a permanent identifier. The application involves a system and method of assigning a permanent identifier to a wireless mobile device that is used with a wireless network that does not expose a permanent identifier for that device. More specifically, a preferred embodiment of the technology provides a system and method for using an Internet Protocol Version 6 ("IPV6") address as a transition address mechanism in a wireless network that currently uses an Internet Protocol Version 4 ("IPV4") address.

2. Description of the Related Art

There are presently several proposals for pushing information to a mobile device in an IP-based wireless network. In these IP-based wireless networks, the mobile devices are not provided with permanent identifiers, but instead are dynamically assigned an IP address from a pool of available addresses. Each time the mobile device makes a network connection, a different IP address is typically assigned to the mobile device. Thus, for services attempting to push information to the particular mobile device, there is no simple way to address the information since the IP address is not permanent. The existing proposals in this domain do not adequately deal with the problems of how to address the mobile device when pushing information to it, and how to bridge the solution to future third-generation (3G) wireless networks. The solutions provided by these proposals involve either creating a proprietary Personal Identifier Number (PIN) for each wireless mobile device, or trying to use a phone number (or similar permanent identifier) of the mobile device to contact it over an alternative communication network, e.g., an SMS over circuit-switched channel.

SUMMARY

A system and method for addressing a mobile device in an IP-based wireless network is provided. Push service providers prepare data for transmission to the mobile device using a first IP address. The addressed data is then routed via a push proxy. The push proxy obtains a network identifier that is permanently associated with the wireless mobile device using the first IP address. The network identifier is then used by the push proxy to obtain a second IP address that is temporarily associated with the wireless mobile device. Using this second IP address, the data from the push proxy is then addressed and transmitted to the wireless mobile device via a tunnel created through the wireless network using the second IP address.

DETAILED DESCRIPTION OF THE DRAWINGS

Figure 1:
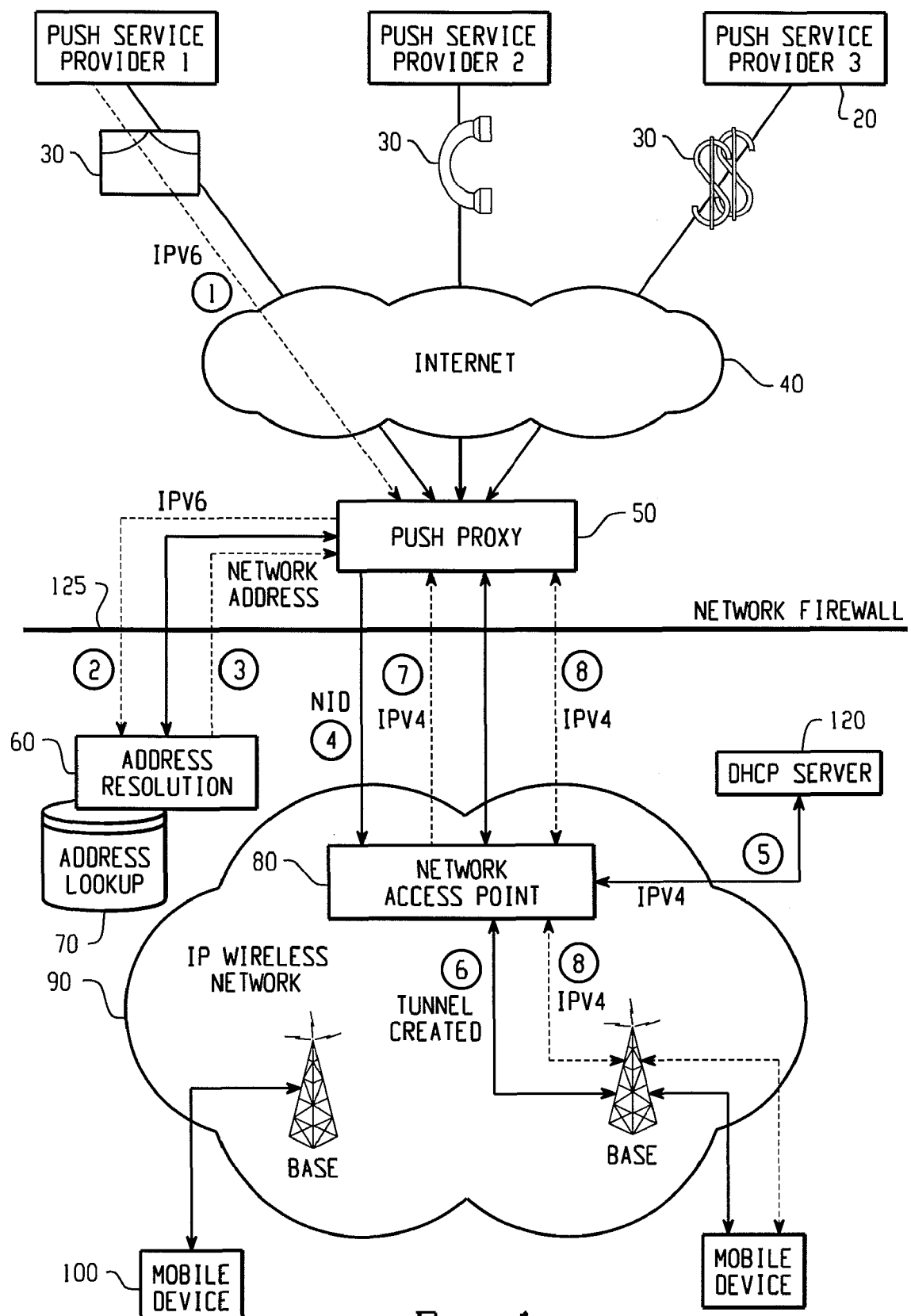
FIG. 1 is a system diagram showing a first method of using an IPV6 address to reference a mobile device.

Turning now to the drawing figures, FIG. 1 is a system diagram showing a first method of using an IPV6 address to reference a mobile device. This system may include one or more push service providers 20, the Internet 40, one or more push proxies 50, a network firewall 125, an address resolution component 60, an address lookup component 70, and an IP-based wireless network 90, which may include one or more network access points 80 and one or more DHCP servers 120.

The push service providers 20 may be e-mail push servers, phone push servers, financial push servers, or any other service that is pushing information to the wireless mobile devices 100. These push servers 20 might by coupled to the Internet 40, and may provide for pushing content to the mobile devices 100. Because the IP-based wireless network 90 does not support direct (or permanent) addressing of the wireless mobile devices 100, a push proxy 50 is used to proxy the address requests into the wireless network 90 on behalf of the push service providers 20. The push proxy 90 then employs a range of methods, conforming to the IP-based wireless network 90, to acquire the currently correct address for the mobile device 100 and to open a tunnel or connection to that mobile device 100 in order to deliver information. The concept of a tunnel is used in IP-based wireless networks, such as the General Packet Radio Service ("GPRS"), as a way of using network resources to deliver IP packets to mobile devices 100. In a preferred embodiment of the system and method shown in FIG. 1, an IPV6 address is used by the push proxy 50 as the permanent identifier for the mobile devices 100. An advantage of using an IPV6 address as the proxy address (as opposed to IPV4, or some other type of address) is that when the IP-based wireless network 90 moves to supporting IPV6 as the addressing mechanism of the network itself, all of the push service providers 20 can continue to communicate to devices without being recalled or removed from use. An IPV4 address is composed of 32 bits, whereas an IPV6 address is composed of 128 bits, thereby disposing of the need to recycle addresses, as is done in IPV4-based IP networks, such as GPRS. This address permanence is the property that facilitates push service providers.

FIG. 1 shows three types of data being pushed to the wireless mobile devices 100, e-mail messages, phone messages or phone calls, and financial data, like stock prices or bank transactions. The range of different types of data that can be pushed to the mobile devices 100, however, may include other types of data. Although each push service provider may identify the user of the information by different identity types internal to the service (financial push services may identify the user by account number, email push services may identify the user with the form user@host.com) all of these services can map the internal identifier to a permanent network identifier for transmission. Therefore, all of the data to be pushed to the mobile devices 100 by the push service providers 20 are addressed using an IPV6 permanent identifier (a first IP address) for the mobile device 100 and sent to one of the push proxies machine 50, which may be running in close proximity to the IP wireless network 90. The location of the push proxy 50, however, can be remote from the wireless network 90, and may use a high-speed direct link to the network 90.

FIG. 1 shows eight steps. In step 1, the push message (data or information to be delivered to the mobile device 100) leaves the push service provider 30 addressed using an IPV6 address (the first IP address) that has been permanently associated with the mobile device 100 at manufacturing time, or when software is loaded into the device, or via some other provisioning step. It is also possible to send an Over-The-Air (OTA) packet to the device that might update the current IPV6 address stored either in the mobile device's 100 flash memory, or with the SIM card. These IPV6 addresses cause any addressed data to be routed to the push proxy 50, preferably over the Internet. Once this addressed push message 30 is received, the push proxy 50 may check the state of its cache to confirm that it does not already have a mapping for the IPV6 address just received (meaning that it need not need to trigger the acquisition of a second IP address from the wireless network 90, because it already has such an address for the particular mobile device 100 being addressed). The push proxy 50 might also employ advanced methods of timeout to expire the cache based on when the IP wireless network 90 will typically delete a tunnel created for exchanging IP packets with the mobile device 100.

Steps 2 through 6 constitute the preferred mechanism for establishing a tunnel that allows the mobile device 100 to be reachable for IP traffic. Triggers for tunnel creation include, but are not limited to the direct network process outlined for updating the cache of first IP address to second IP address. The trigger process of steps 2 through 6 is performed if the cache is not present or does not have a valid entry for the given IPV6 address. The push proxy 50 performs step 2 and submits the received IPV6 address to the address resolution component 60. This network-centric component 60 maintains a mapping of IPV6 to Network ID (NID) within a address lookup database 70. The Network ID is a permanent identifier used by the network 90 to identify a particular wireless mobile device 100, but is not used for addressing. In step 3, if a mapping is found the NID is returned to the push proxy 50. In the GPRS network, for example, this NID may correspond to the IMSI of the mobile device 100. The IMSI is a proprietary and globally unique identifier assigned to each mobile device 100 that the network operator keeps secret with their network. The push proxy 50 has been authorized to access these NID values across the network firewall 125 and is trusted to keep the NID value secret. The desire to keep the GPRS NID (the IMSI) secret is an externally supplied constraint related to its use for billing and provisioning purposes. An optimization available for steps 2 and 3 is to select a first IP address that embeds the NID. The resolution then involves a simple extraction or, if in order to mask the NID, an extraction with a transformation can be used.

In step 4 the push proxy 50 requests a network-initiated tunnel be created to the mobile device 100 identified with the retrieved NID value. In the GPRS network, for example, this tunnel is called a PDP-context and allows IP packets to be exchanged with the mobile device. This tunnel request is given to the network access point 80, which is called a GGSN in the GPRS network. In step 5 the GGSN may use a DHCP server 120 to assign an actual IPV4 address (second IP address) to the mobile device 100, assuming the mobile device 100 does not currently have an IPV4 address assigned to it. Most IP-based wireless networks expire PDP contexts and take back IPV4 addresses to conserve address resources and re-assign them only when data must be exchanged.

In step 6, once the GGSN has assigned an IPV4 address (second IP address) for the mobile device 100, it can request that the mobile device 100 open a PDP context with the provided IPV4 address. The PDP context will have the mobile device 100 as one end of the tunnel, and the push proxy 50 available at the other end of the tunnel (the pdp context itself terminates at the GGSN in GPRS, but the presence of the tunnel allows the mobile device 100 to be reachable for IP communication.) In step 7 the newly acquired IPV4 address is given back to the push proxy 50, either by the network access point 80, or by the mobile device 100. A useful mechanism to receive the second IPV4 address from the network access point 80 without the explicit participation of the network access point is to monitor the DHCP allocation transaction. Step 8 demonstrates the full two-way exchange of information between the proxy 50 and the wireless mobile device 100, once the tunnel has been opened. Using this system and method, a first IP address, such as an IPV6 address, which is permanently associated with a wireless mobile device 100, may be used by a proxy machine 50 to access and acquire a second IP address, such as an IPV4 address, in order to create a tunnel to the wireless mobile device over an IP-based wireless network that does not permanently assign IP addresses to the mobile devices 100.

Figure 2:
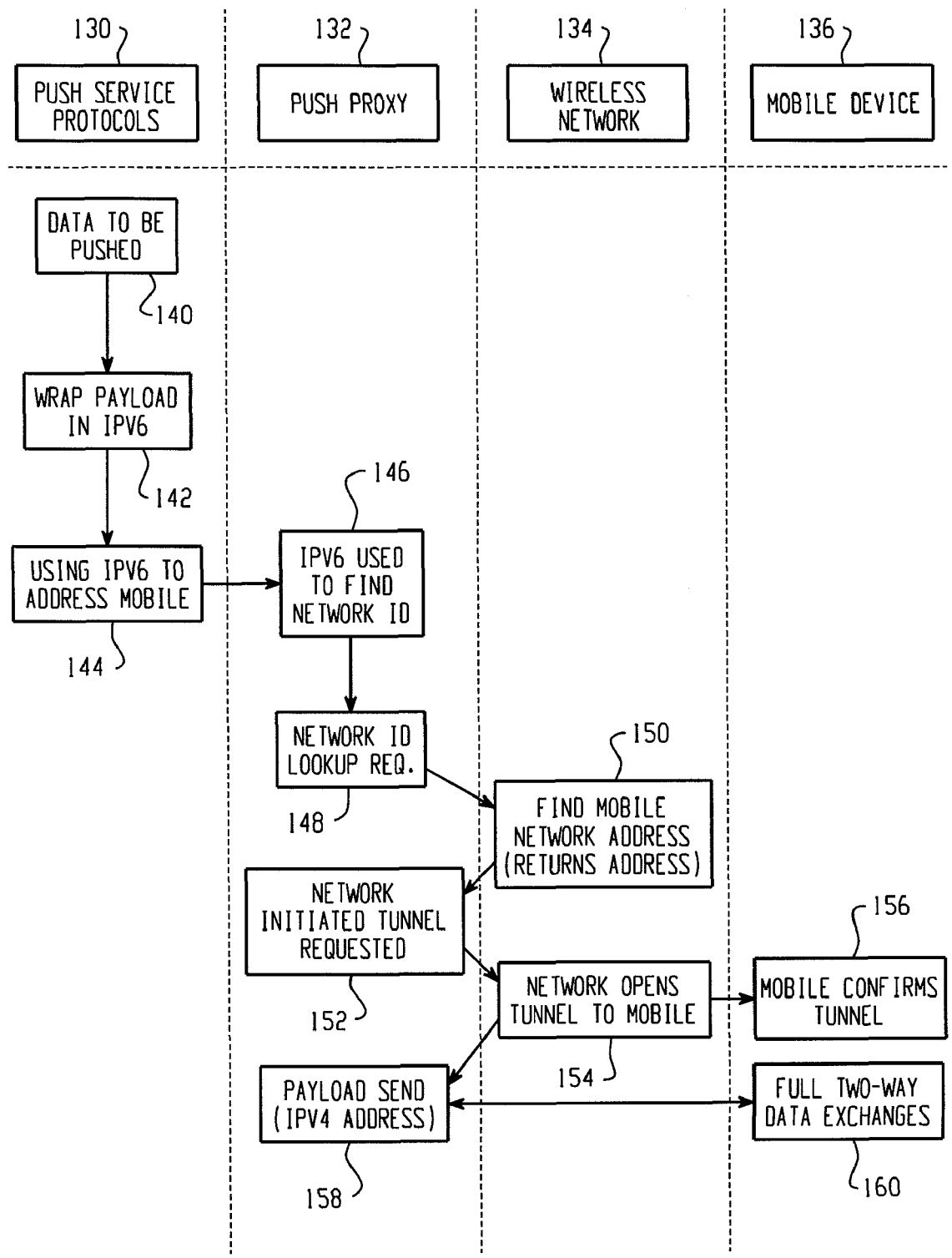
FIG. 2 is a state diagram of the first method of using an IPV6 address to reference a mobile device.

FIG. 2 is a state diagram of the first method of using an IPV6 address to reference a mobile device. State 130 identifies steps carried out by the push service providers 20. State 132 identifies steps carried out by the push proxy 50. State 134 identifies steps carried out by the wireless network 90. And state 136 identifies steps carried out by the wireless mobile device 100.

Beginning with the push service state, data to be pushed is identified for transmission in step 140. Then, at step 142, the data to be pushed is wrapped (or encapsulated) in a first IP datagram, such as an IPV6 datagram. Finally, at step 144, the payload is addressed using the 128 bit IPV6 address that has been permanently assigned to a particular wireless mobile device 100, and the payload is transmitted from the push server 20 to the Internet 40. Various existing mechanisms for transmitting IPV6 packets over a predominantly IPV4 internet are available Because the IPV6 address of the mobile device 100 is affiliated with the push proxy 50, the payload will be delivered to the push proxy 50. Beginning at step 146 of the push proxy state 132, the IPV6 address included in the data payload from the push service provider is used by the push proxy 50 to obtain the network identifier (NID) of the particular wireless device 100 being addressed. At step 148, the push proxy 50 contacts the address resolution component 60 and provides the IPV6 address to this component. The address resolution component 60 then uses the IPV6 address to determine whether a match exists in its database 70 mapping IPV6 address to NIDs. If a match exists, then the appropriate NID is returned to the push proxy 50. Once the push proxy has obtained the NID address of the particular mobile device 100 it is attempting to push data to, the push proxy 50 then makes a tunnel request (step 152) to the wireless network 90. The wireless network 90 responds to the tunnel request (step 154) by acquiring (typically allocated by a DHCP server) a second IPV4 address for the mobile device 100 and by forming a logical tunnel between the network access point 80 and the particular mobile device 100. The mobile device confirms the tunnel is created at step 156 of the mobile device state 136 and the second (IPV4) address is returned to the push proxy. Finally, the push proxy at step 158 transmits the push data payload using the IPV4 address provided from the wireless network 90, and at step 160, the mobile device 100 can respond with requests for additional data.

Figure 3:
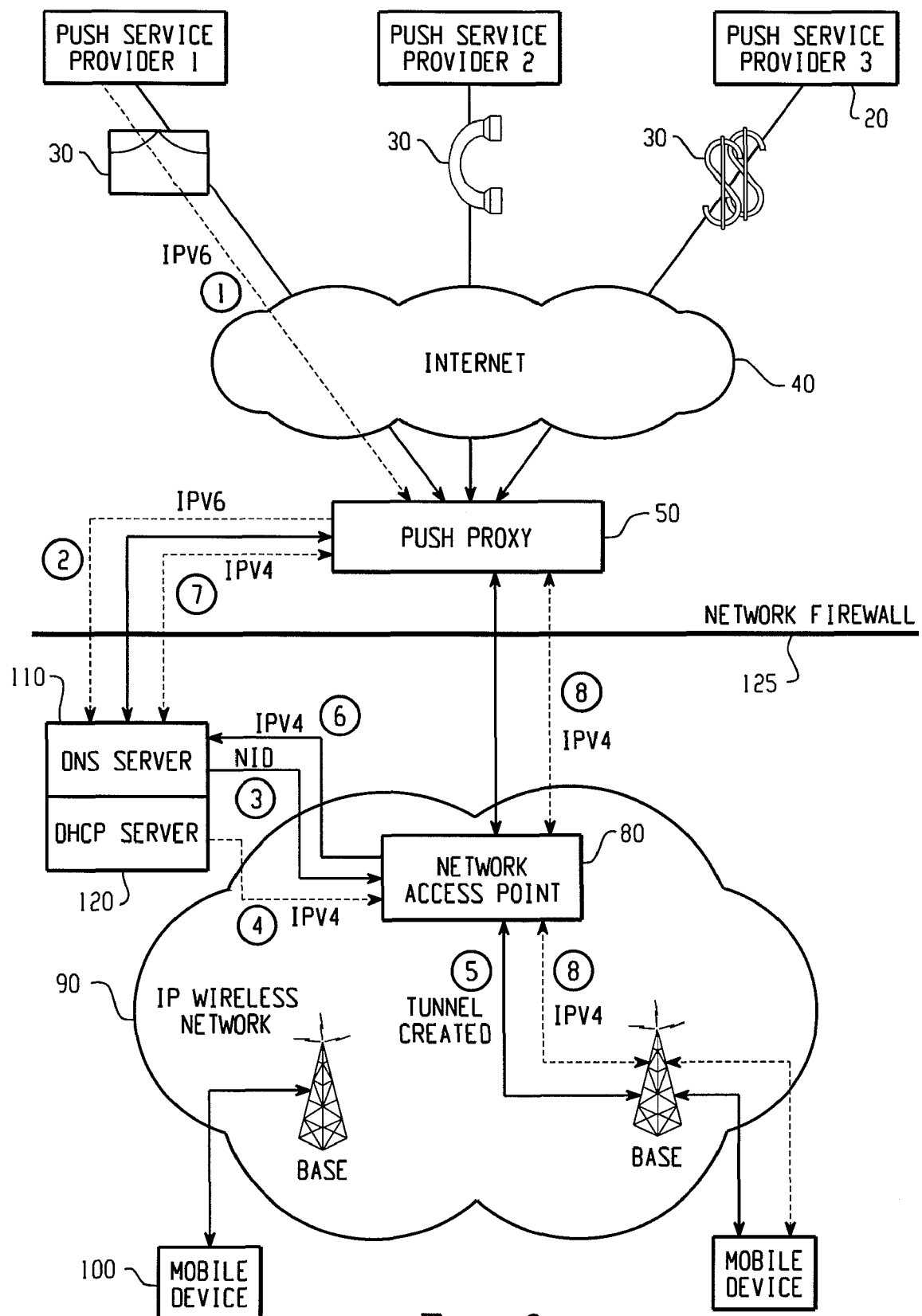
FIG. 3 is a system diagram showing a second method of using an IPV6 address to reference a mobile device.

FIG. 3 is a system diagram showing a second method of using an IPV6 address to reference a mobile device. In this example, instead of using an address resolution component, the push proxy 50 performs a name lookup request through a standard DNS interface 110 in order to identify the particular mobile device 100. The push proxy 50 supplies the IPV6 address of the mobile device 100 to the DNS interface 100, which then transmits a tunnel request signal to the network access point 80 along with the NID of the mobile device 100. In this embodiment, the DNS interface 110 has a direct relationship with the network access point 80 and submits the request to open a tunnel directly to the network access point 80.

Operationally, the system shown in FIG. 3 works much like the system shown in FIG. 1. All of the data to be pushed to the wireless mobile devices 100 is addressed using an IPV6 address (or first IP address) as the permanent identifier for the mobile device, and is transmitted to a common push proxy machine 50, which can be running in close proximity to the IP wireless network 90. Alternatively, however, the push proxy 50 can be running in another country and may use a high-speed direct link to the wireless network 90. Once this push data is received, the push proxy 50 will check the state of its cache to confirm that it does not already have a mapping for the IPV6 address received. In step 2, the push proxy 50 then submits a standard DNS query to the IP wireless network's 90 DNS server 110, which is accessible only through the network's firewall 125. The DNS server 110 is given an IPV6 address and it looks up the matching network identifier (NID) for the mobile device 100.

In step 3, the DNS makes a proprietary request to the network access point 80 to open a network initiated tunnel (PDP Context) to the mobile device 100 bearing the provided NID. In step 4, the optimization of monitoring the DHCP allocation is shown as a mechanism to determine the IPV4 address from the network access point 80 without explicit participation. Step 5 is the creation of the network tunnel to the mobile device 100 with the newly assigned IPV4 address. Step 6 occurs after the tunnel is opened if the network access point 80 explicitly returns the assigned IPV4 address to the DNS server 110. Step 7 is when the DNS server fulfills the original request from the push proxy 50 by returning the assigned IPV4 address. A positive return from the DNS server 110 with an IPV4 value confirms that a tunnel now exists to the mobile device 100. A negative response would indicate that the tunnel failed to open. In the final step 8, the push proxy 50 then transmits and receives IP packets to the mobile device 100 using the IPV4 address and the network created tunnel.

Figure 4:
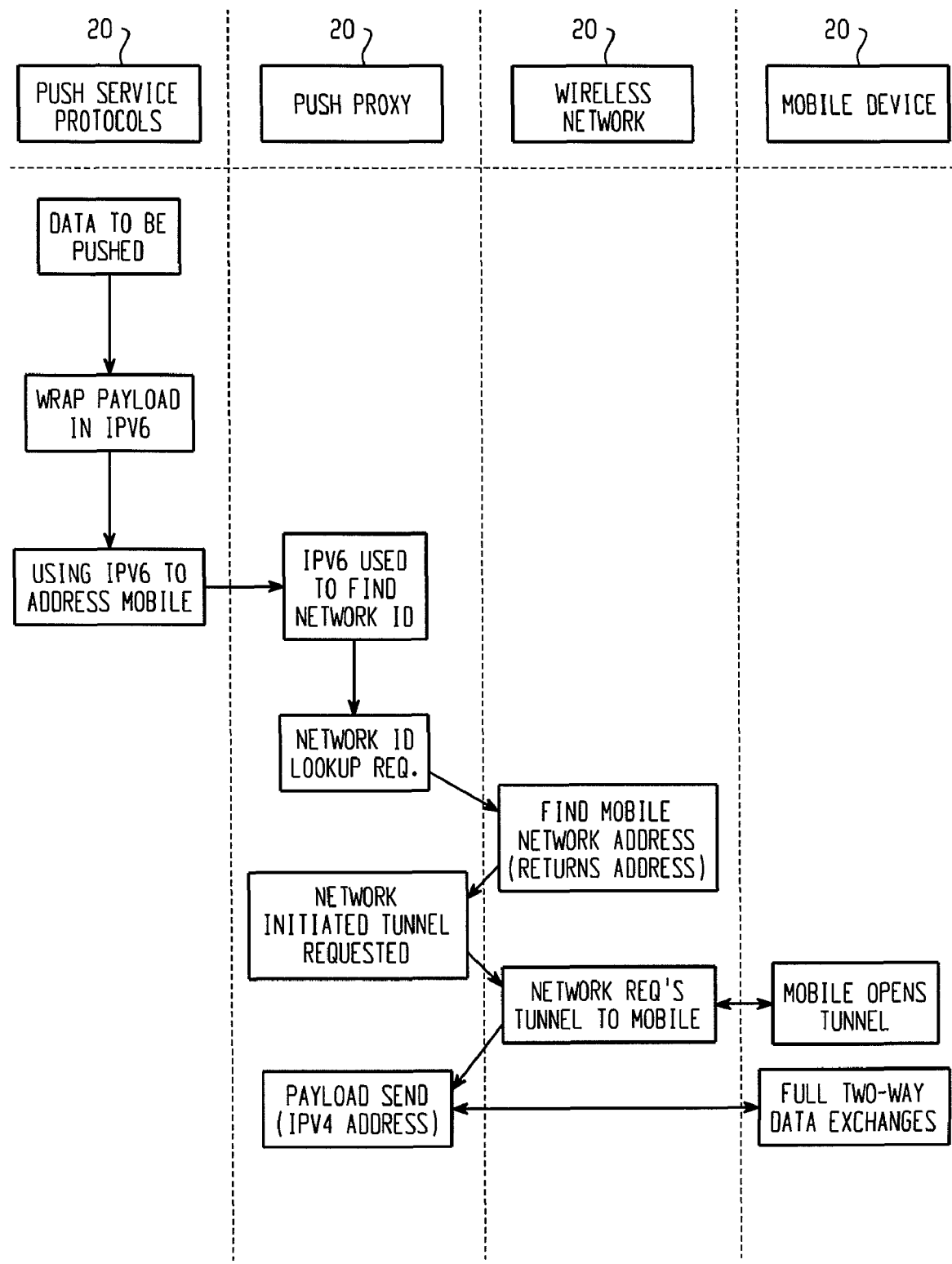
FIG. 4 is a state diagram of the second method of using an IPV6 address to reference a mobile device.

FIG. 4 is a state diagram for the second method of using an IPV6 address to reference a mobile device. This diagram is essentially the same as FIG. 2, although the steps conform to those described above with reference to FIG. 3 as instead of FIG. 1.

Figure 5:
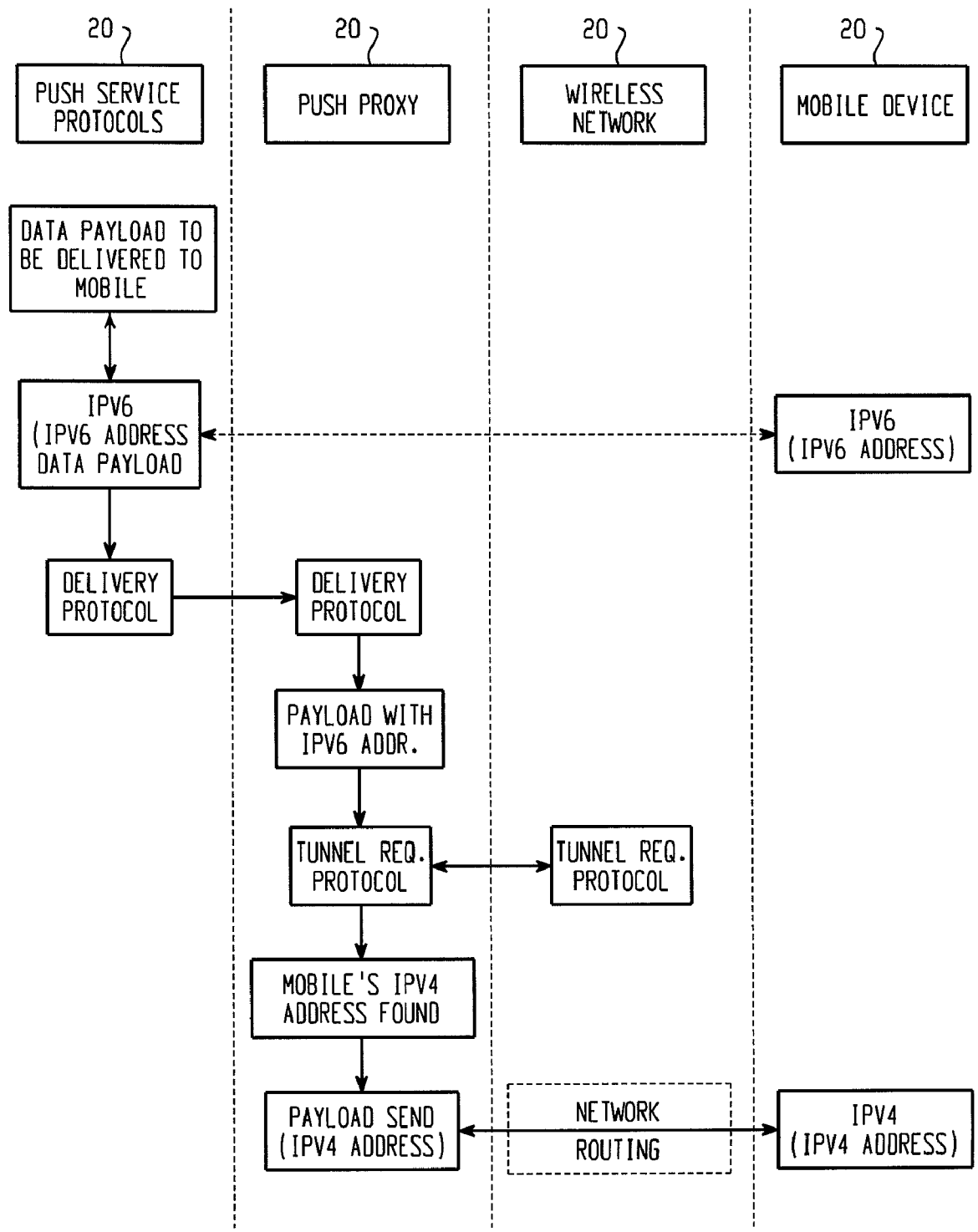
FIG. 5 is a diagram showing the preferred protocols used to exchange data with the mobile device using IPV6 addressing.

FIG. 5 is a diagram showing the preferred protocols used to exchange data with the mobile device using IPV6 addressing. In this figure, the steps involved with obtaining an IPV4 address (or second IP address) for the mobile device 100, and then opening an IPV4 tunnel (as described more specifically above with reference to FIGS. 1 and 3) are shown generically on the bottom part of the Figure. This figure also shows that where the wireless network 90 also supports the first IP address type, for example the IPV6 type of IP address, the push service provider 20 can deliver the push data payload to the mobile device 100 directly through the push proxy 50 and the wireless network 90 by simply addressing the payload using IPV6 and transmitting the payload to the mobile device 100. In this manner, push service providers 20 can begin to use IPV6 addressing with current non-IPV6 networks, and can then continue to use this same addressing scheme as IPV6 networks become active. In addition, this method provides a forward compatibility path for the push proxy 50.

Figure 6:
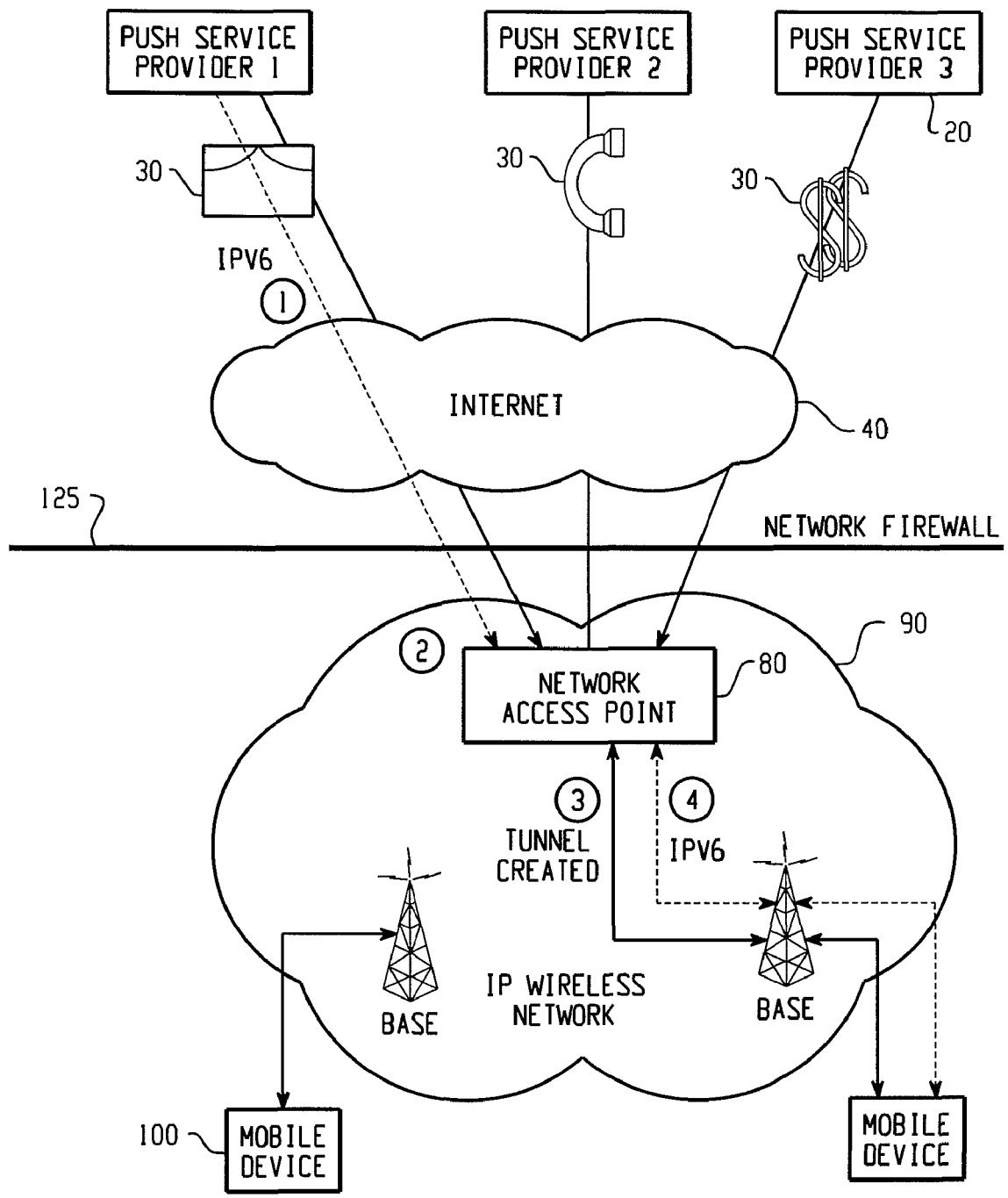
FIG. 6 is a diagram showing the use of IPV6 addressing when the IP wireless network is using the IPV6 protocol.

FIG. 6 is a diagram showing the use of IPV6 addressing when the IP wireless network is using the IPV6 protocol. In this illustration, the push proxy 50 is no longer utilized as the first IP address (such as IPV6) can be used through the Internet 40 and within the IP wireless network 90. Since the push service 20 was already encapsulating the payload in IPV6, as shown in FIGS. 1-4, this will make the transition to full IPV6 essentially seamless. The network access point 80 can continue to be protected by a network firewall 125, where each push service provider 20 can be qualified for the protection of the wireless network 90 and each mobile device 100 that might receive the pushed data.

FIG. 6 shows a set of well-defined push service providers 20 that may be known to the wireless network operator and authorized to transmit data through a network firewall 125. The data content to be pushed to the mobile device 100 is placed into an IPV6 packet, and addressed using the IPV6 permanent identity assigned to the mobile device 100 at manufacturing time. For those mobile devices 100 that used the IPV6 identifier before IPV6 support was present, there is no need to change the device's identifier as it can continue to be used. In step 2, once the network access point 80 receives the pushed data, it can perform a direct network request to determine the state of the mobile device 100 and to request a tunnel initiation. In this situation, where IPV6 is used within the network, and IPV6 permanent identifiers are standard, the DHCP server 120 does not assign and release IPV6 addresses. Because the PDP Contexts and tunnels cost valuable resources, however, these tunnels may still be raised and lowered as required for data exchange. If the mobile device 100 already has a tunnel (PDP Context), then the network access point 80 can immediate send the pushed data to the mobile device 100. Otherwise, in step 3, the network access point 80 performs a tunnel request of the mobile device 100 to open a tunnel for data exchange. Once the tunnel is open step 4 allows the full exchange of data in both directions.

This accelerated push of data in an IP-based wireless network 90 illustrates the advantages of presently using an IPV6 address even though IPV6 is not native to many of today's wireless networks. The forward compatibility of mobile devices 100, which already have the correct identification values, can further accelerate the adoption of IPV6 in the wireless network 90. Another advantage of this method is the use of the IPV6 protocol between the service provider 20 and the mobile device 100. By placing IPV6 into the mobile device 100 before it is native in the wireless network 90, the mobile device 100 can be further advanced when IPV6 becomes native in the network.

Figure 7:
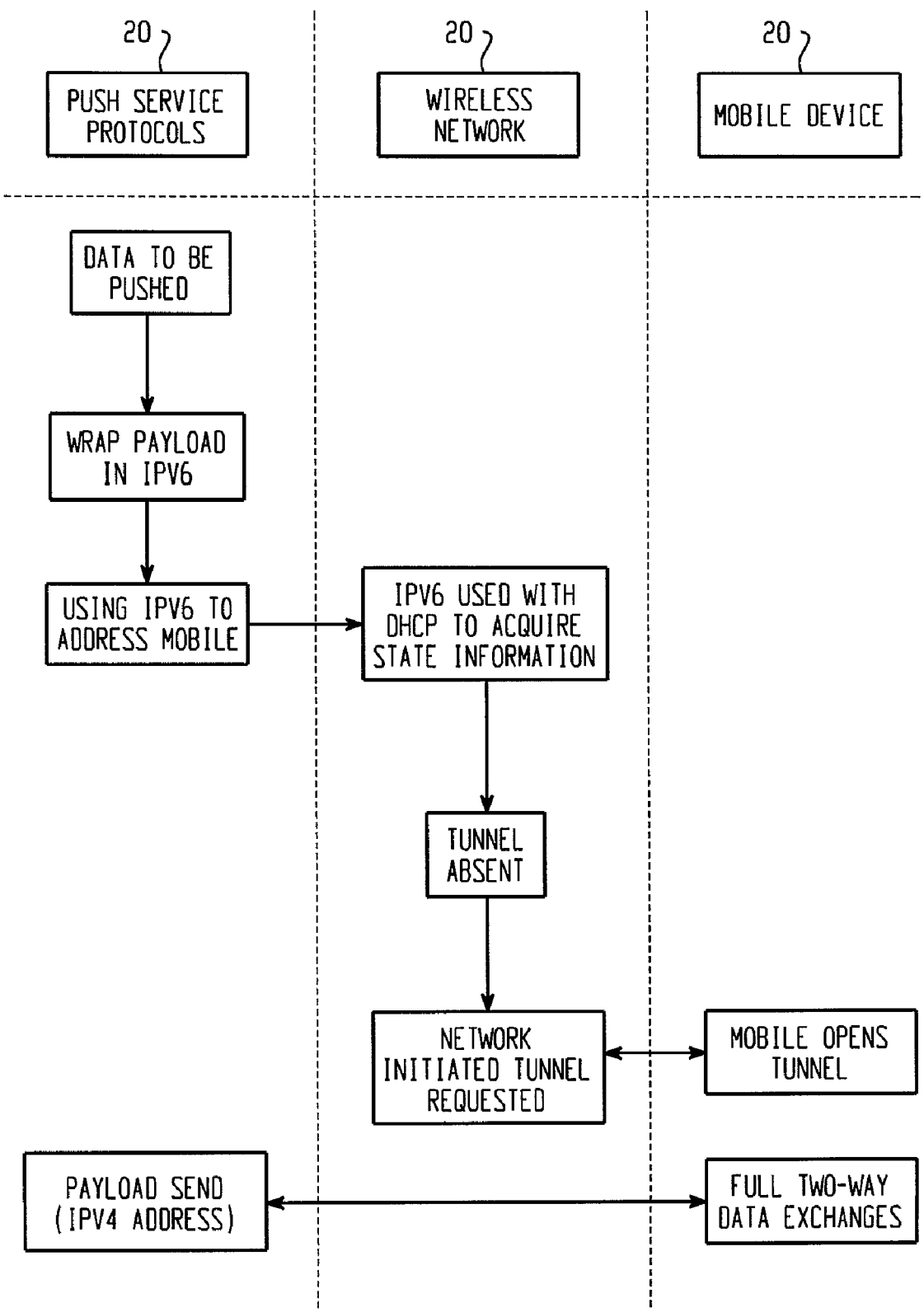
FIG. 7 is a state diagram showing the use of IPV6 addressing.

FIG. 7 is a state diagram showing the use of IPV6 addressing. These states, and methods steps track the description of FIG. 6, set forth above.

Figure 8:
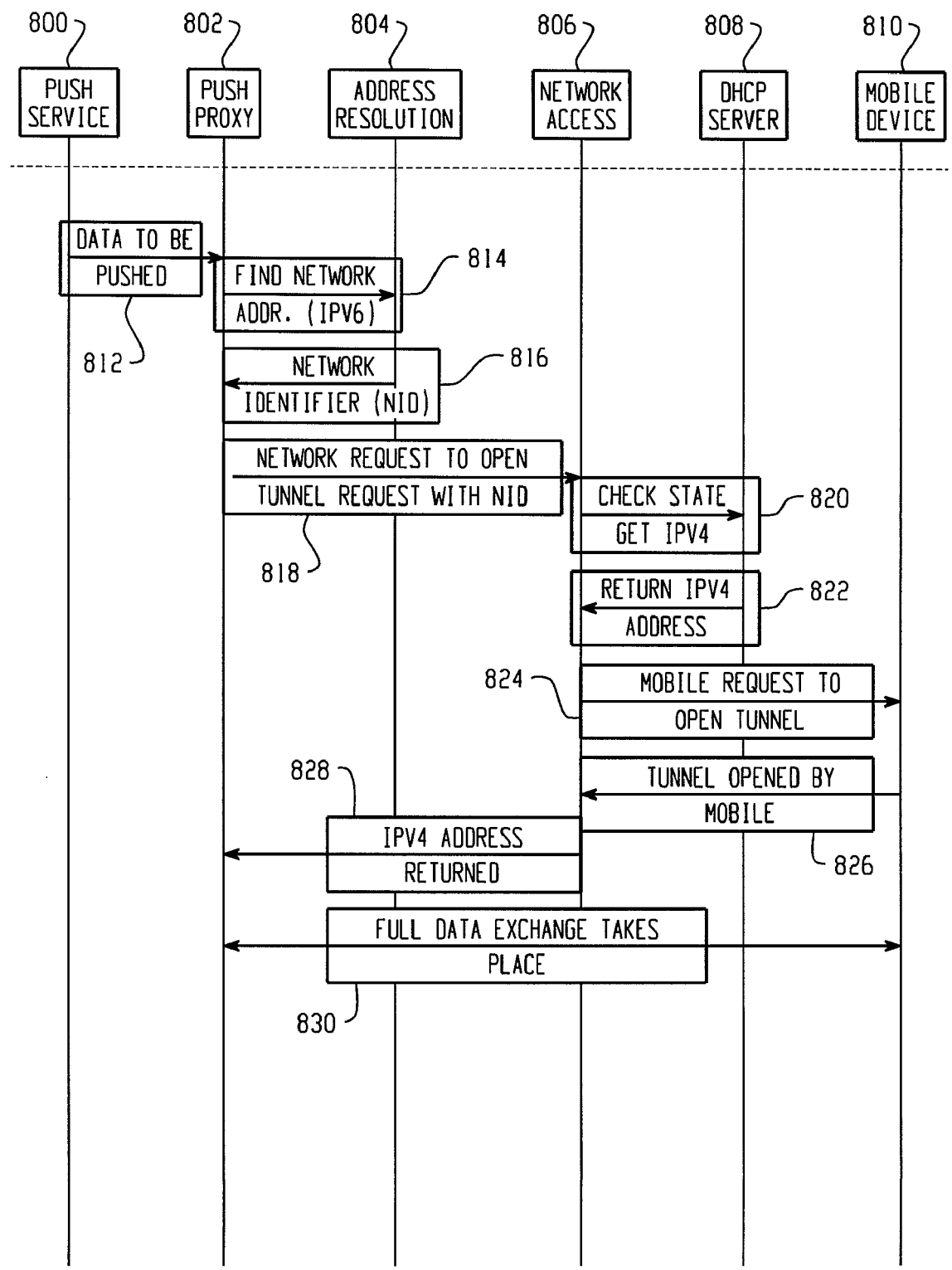
FIG. 8 is data flow diagram showing the steps in the first method of using IPV6 for addressing the mobile device.

FIG. 8 is data flow diagram showing the steps in the first method of using IPV6 for addressing the mobile device 100. The push service 800 first pushes data 812 to the push proxy 802. Once received, the push proxy 802 must find the network identifier (NID) by using the IPV6 address 814 provided in the data from the push service 800. The NID lookup is performed by the Address Resolution 804 component, which could be any database lookup engine within the network. The network identifier (NID) is returned 816 to the push proxy 802 so that it can be used to open a tunnel to the mobile device 810. Once the NID is received by the push proxy 802 a network initiated tunnel request can be made using the NID 818. This request is received by the network access point 806, which is the GGSN in GPRS. The first step is for the network access point 806 to verify the state of the mobile device to ensure an IPV4 address is not already assigned 820 by the DHCP server 808. If there is no tunnel and no IPV4 address assigned by the DHCP server 808, a new IPV4 address is allocated and returned 822 to the network access point 806. The network access point 806 then makes a tunnel open request 824 to the mobile device 810. The mobile device 810 opens the tunnel using the IPV4 address provided 826. Once the tunnel is opened the network access point 806 returns the IPV4 address 828 for the mobile device 810 to the push proxy 802. At this point there is a full two-way data exchange possible 830 between the push proxy 802 and the mobile device 810.

Figure 9:
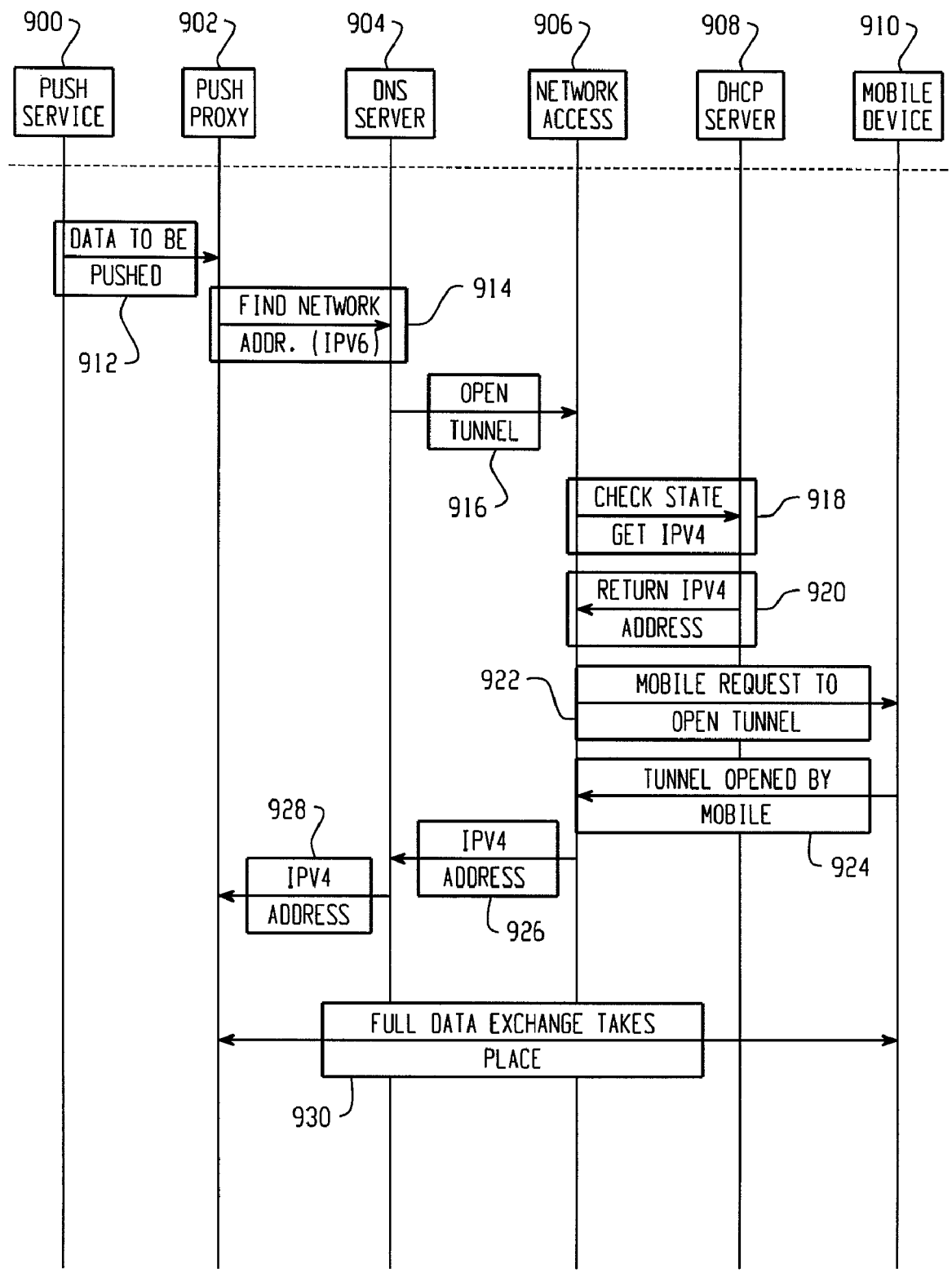
FIG. 9 is data flow diagram showing the steps in the second method of using IPV6 for addressing the mobile device.

FIG. 9 is data flow diagram showing the steps in the second method of using IPV6 for addressing the mobile device. The push service 900 first pushes data 912 to the push proxy 902. Once received the push proxy 902 must find the network identifier (NID) by using the IPV6 address 914 provided in the data from the push service 900. The push proxy 902 uses a standard DNS lookup method to find the network identifier 914 from the DNS server 904. The DNS server 904 then performs an open tunnel request 916 to the network access point 906 using the NID. This request is received by the network access point 906, which is the GGSN in GPRS. The first step is for the network access point 806 to verify the state of the mobile device to ensure an IPV4 address is not already assigned 918 by the DHCP server 908.

If there is no tunnel and no IPV4 address assigned by the DHCP server 908, a new IPV4 address is allocated and returned 820 to the network access point 906. The network access point 906 then makes a tunnel open request 922 to the mobile device 910. The mobile device 910 opens the tunnel using the IPV4 address provided 824. Once the tunnel is opened the network access point 906 returns the IPV4 address 926 to the DNS server 904. The DNS server in turn completes the push proxy's 902 request for an address by returning the new IPV4 address 928. At this point there is a full two-way data exchange possible 930 between the push proxy 902 and the mobile device 910.

Figure 10:
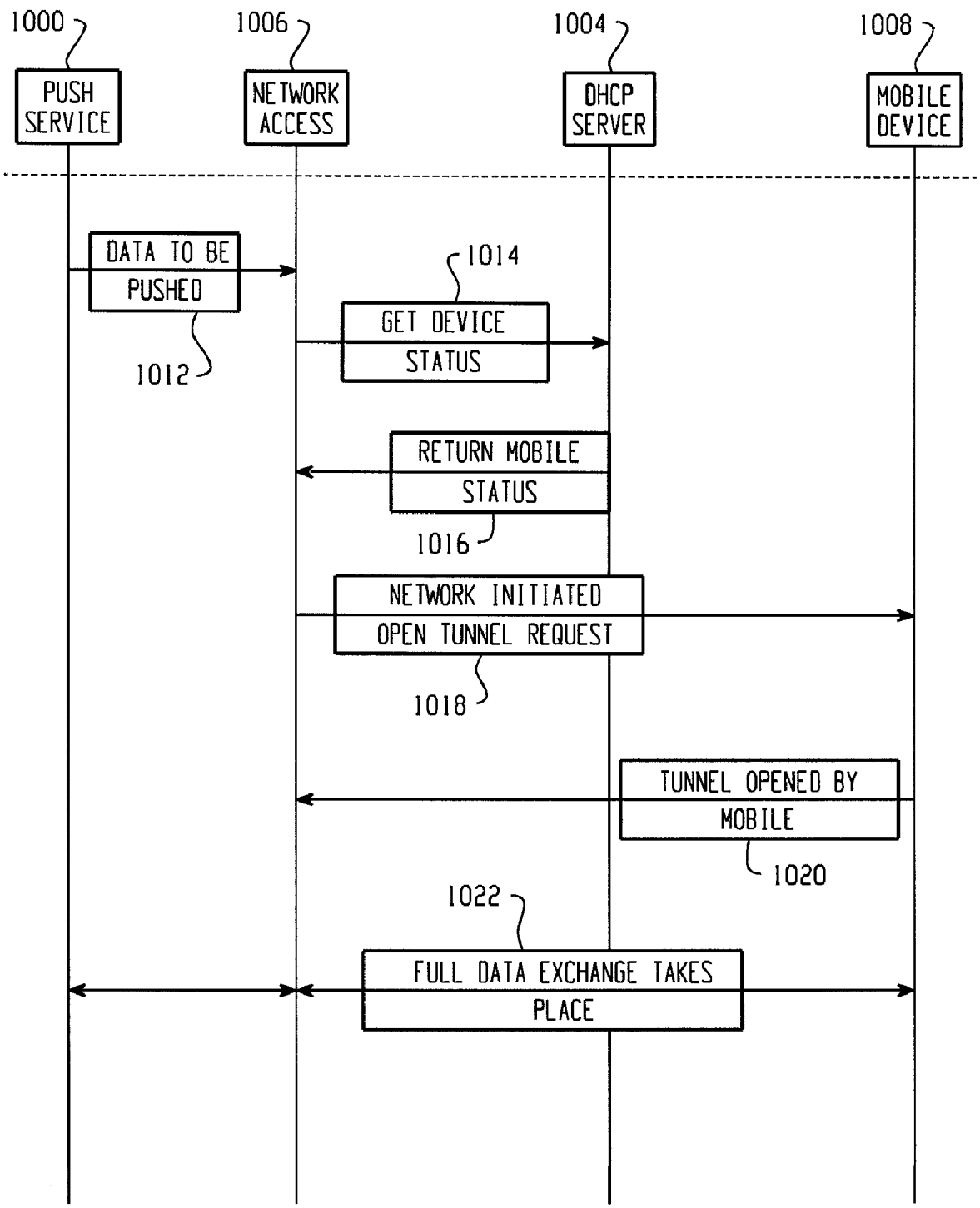
FIG. 10 is a data flow diagram showing the steps taken to address a mobile device using an IPV6 address when the IP network supports the IPV6 protocol.

FIG. 10 is a data flow diagram showing the steps taken to address a mobile device using an IPV6 address when the IP network supports the IPV6 protocol. This figure illustrates the use of an IPV6 identifier in an IP wireless network that supports IPV6 addressing natively. The push service 1000 first pushes data 1012 to the network access point 1006. The network access point 1006 then obtains the status of the identified wireless mobile device at 1014, which is returned from the DHCP server 1004 at step 1016. A network initiated tunnel is then opened between the network access point 1006 and the wireless mobile device 1008 at steps 1018 and 1020. At this point 1022 there is enabled a full two-way exchange of data between the push service 100 and the wireless mobile device 1008.

The detailed description of the drawing figures, the brief description of the drawing figures, the summary, the abstract, and the field of technology set forth a preferred embodiment of the invention. These sections are not meant to limit the scope of the invention, which is defined by the claims.

What is claimed:

1. A method of addressing data to a wireless device, the wireless device having a permanently associated first IP address, comprising:
    receiving data addressed to the wireless device using the first permanently associated IP address;
    obtaining a network identifier for the wireless device using the permanently associated first IP address by performing an address lookup function with an address resolution component associated with an IP-based wireless network that matches the first permanently associated IP address with a database of network identifiers, the network identifier uniquely identifying the wireless device within the IP-based wireless network;
    obtaining a second IP address that is temporarily associated with the wireless device from the IP-based wireless network using the obtained network identifier;
    addressing the received data using the second IP address; and
    transmitting the received data to the wireless device using the second IP address.

2. The method of claim 1, wherein the first IP address is an IPV6 address.

3. The method of claim 2, wherein the second IP address is an IPV4 address.

4. The method of claim 1, wherein the IP-based wireless network is a General Packet Radio Service (GPRS) network, and the network identifier is the IMSI of the wireless device.

5. The method of claim 1, further comprising:
    providing the first IP address to a DNS server associated with the IP-based wireless network; and
    accessing a database of network identifiers at the DNS server based on the first IP address.

6. The method of claim 1, further comprising:
    transmitting the network identifier to the IP-based wireless network;
    causing a wireless network component to access a database associated with the IP-based wireless network in order to determine whether the second IP address has been associated with the network identifier; and
    if the second IP address has been associated with the network identifier, receiving the second IP address from the IP-based wireless network.

7. The method of claim 1, further comprising:
    opening a connection to a network access point of the IP-based wireless network;
    initiating a tunnel between the network access point and the wireless device using the network identifier; and
    transmitting the data using the second IP address over the connection to the network access point, and the tunnel created between the network access point and the wireless device.

8. The method of claim 7, wherein the tunnel is a PDP-context.

9. The method of claim 1, further comprising:
checking a cache memory to determine if an association is present between the first IP address and a second IP address.

10. The method of claim 1, wherein the network identifier is embedded within a portion of the first IP address, further comprising extracting the network identifier from the portion of the first IP address.

11. A proxy server for addressing data to a wireless device, the wireless device having a permanently associated first IP address, comprising:
a wireless network interface component that obtains a network identifier for the wireless device using the first permanently associated IP address by performing an address lookup function with an address resolution component associated with an IP-based wireless network that matches the first permanently associated IP address with a database of network identifiers, the network identifier uniquely identifying the wireless device within the IP-based wireless network;
wherein the network interface component, responsive to the network identifier of the wireless device, is configured to obtain a second IP address that is temporarily associated with the wireless device from the IP-based wireless network;
a data addressing component that addresses data received at the proxy with the first IP address using the second IP address; and
a transmitter that transmits the data from the proxy to the wireless device using the second IP address.

12. The proxy server of claim 11, wherein the first IP address is an IPV6 address.

13. The proxy server of claim 12, wherein the second IP address is an IPV4 address.

14. The proxy server of claim 11, wherein the IP-based wireless network is a General Packet Radio Service (GPRS) network, and the network identifier is the IMSI of the wireless device.

15. The proxy server of claim 11, wherein the wireless network interface component is configured to provide the first IP address to a DNS server associated with the IP-based wireless network and to access a database of network identifiers at the DNS server based on the first IP address.

* * * * *